March 4, 1930.  F. W. SPRINGER  1,749,397
ELECTRICAL SYSTEM
Filed April 27, 1925  2 Sheets-Sheet 2

Patented Mar. 4, 1930

1,749,397

UNITED STATES PATENT OFFICE

FRANKLIN W. SPRINGER, OF MINNEAPOLIS, MINNESOTA

ELECTRICAL SYSTEM

Application filed April 27, 1925. Serial No. 26,100.

My invention relates to electrical systems. It is particularly applicable to electric lighting and starting systems for motor vehicles and systems of similar nature. The present invention is an improvement on that of my copending application Serial No. 156,759, filed March 22, 1917, which issued April 28, 1925 as Patent No. 1,535,956.

One of the objects of my invention is to provide means whereby the output of the generator may be regulated appropriately to the demand thereon, and, more particularly, where the generator supplies a storage battery to which may be connected lamps, or other translating devices, appropriately to the demand of the battery and translating devices.

Another object is to provide means whereby a battery may be charged at a suitable rate whether or not translating devices are connected to the battery and more particularly at a rate or rates such as will quickly restore the battery to its substantially fully charged condition; and, more specifically, to reduce such charging rates to a safe value when the battery has reached a predetermined state of charge whether or not translating devices are connected to the battery.

Still another object is to provide, in a storage battery charging system, means whereby lamps connectible to the battery will, during such times as operating conditions may require it, be supplied in parallel with the battery while it is being charged to the end that more efficient and safer lighting will be attained.

A further object is to provide a storage battery charging and distribution system whereby the life of the battery is prolonged, and, more specifically a system which will during the operation thereof, keep the battery at or near the fully charged state without unnecessary over-charging.

A still further object is to provide a storage battery charging and distribution system whereby when the battery has reached a certain state of charge it will be supplied with a trickling or conditioning charge.

A more specific object is to provide a storage battery charging and distribution system in which the generator will automatically supply the system at two or more different outputs, or charging characteristics, the number of such characteristics depending upon the effects desired.

Other more specific objects are to provide means whereby a third brush generator may be regulated appropriately to the demand thereon, and, more particularly, where the generator supplies a storage battery to which may be connected lamps or other translating devices, appropriately to the demand of the battery and translating devices, and, more particularly in which the generator will automatically supply the system at two or more different outputs, or charging characteristics, the the number of such characteristics depending on the effects desired, or in accordance with the demand of the battery and translating devices as will more fully appear hereinafter.

Still another object is the provision of a system or modified systems for attaining the objects of my invention in an efficient, simple and reliable manner. Other objects will appear hereinafter as the description of my invention proceeds.

The novel features of my invention will appear from this specification and the accompanying drawings forming a part thereof and showing several embodiments of said invention and all these novel features are intended to be pointed out in the claims.

Figure 1:
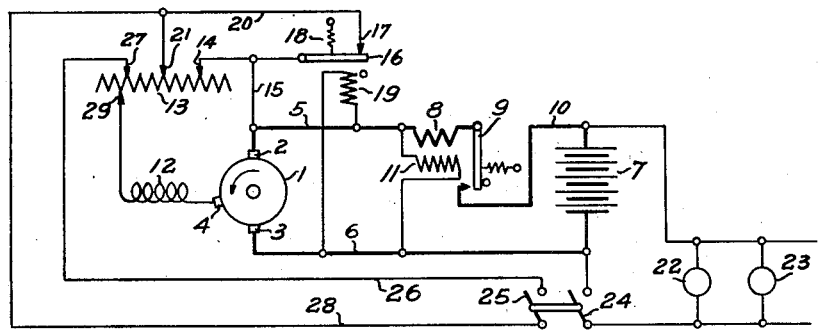
Fig. 1 is a diagrammatic showing of a system in which my invention has been embodied.

Referring now to Fig. 1, my invention is here shown as applied in connection with a third brush generator 1, though in certain aspects of the invention other forms of generators may be employed. The generator 1 is here shown, by way of example, as having two main brushes 2, 3 and an auxiliary or third brush 4, the main brushes 2, 3 being connected to conductors 5, 6 respectively, conductor 6 being connected to one terminal of a storage battery 7. Conductor 5 is connectible through a series coil 8 and an armature 9 of an automatic cut-out or reverse current relay of any well known form through the usual contact of the automatic cut-out, and a conductor 10, to the other terminal of the battery 7. The automatic cut-out is provided with a shunt coil 11 connected across the conductors 5, 6.

The generator (if of the third brush type) is here shown as provided with a shunt field winding 12 only, though in certain aspects of the invention other windings may be employed. The winding 12 is here shown as having one terminal connected to the third brush 4 and the other adjustably connected by a tap 29 to a resistance 13. The resistance 13 is here shown as provided with an adjustable tap 14 connected to a conductor 15 in turn connected to the conductor 5 thus completing a possible path for current through the field winding 12 from brush 4 to brush 2. The tap 14 may also be connected to an armature 16 of a relay here shown as of the electromagnetic type, although this relay may be of other types. The armature 16 is biased against a stationary contact 17 by a spring 18 and this bias may be overcome by a winding here shown as a shunt coil 19 connected across the conductors 5, 6. The contact 17 is connected by a conductor 20 to a tap 21 adjustable on resistance 13. Lamps or other translating devices 22, 23 are here shown as connectible through a switch 24 to the battery 7. Means responsive to the connection of the devices 22, 23 is provided for controlling the resistance 13 or a portion thereof. This means is here shown as an auxiliary switch 25 operable in unison with switch 24. One terminal of switch 25 is connected through a conductor 26 to an adjustable tap 27 on resistance 13; the other terminal is here shown as connected through a conductor 28 to the tap 21. The resistances between the various taps on resistance 13 may, if desired, be independent, adjustable or non-adjustable units which may be connected together. If the system is used on a motor vehicle the relay coil 19 may be made connectible if desired to the conductors 5, 6 by means of an ignition controlling switch as clearly shown, for example, in Fig. 2 of my copending application hereinabove referred to.

The operation of the system shown in Fig. 1 is as follows: When the speed of the generator rises to a predetermined value the coil 11 of the automatic cut-out causes the connection of the generator to the battery 7. If the battery 7 is not up to its fully charged condition represented, by way of example merely, by a potential at say 7.3 to 7.8 volts, the battery having been subjected to a more or less heavy drain by, for example, the starting motor of a motor vehicle, or otherwise, the coil 19 will not be sufficiently energized to attract armature 16. That portion of resistance 13 between taps 14, 21 will therefore remain short-circuited and the generator will operate with that portion of resistance 13 between tap 21 and tap 29 inserted in series with the field winding 12. The value of this resistance may be such that the output characteristic will be, if the generator is of a certain third brush type, of the form shown by curve A, Fig. 7, having a maximum value $A_{max}$. This maximum value may be so selected that the battery will be brought up to a desired fully charged state with desired rapidity at a moderate generator speed. When the battery voltage reaches a predetermined value, the coil 19 causes armature 16 to insert the resistance between taps 14, 21 in the field winding of the generator resulting in the reduction of the output characteristic to a curve, such, for example, as A' in Fig. 7, having a maximum value $A'_{max}$. This curve may be so selected that the battery will be given a trickling or conditioning charge of comparatively small amperage. This conditioning charge is of considerable advantage especially in cases where the battery has sulphated more or less by standing in a discharged condition. When such a battery is charged at a comparatively high rate such as represented by curve A, the voltage across it will rise to an amount sufficient to effectively energize relay 19 before the battery has reached its full capacity. The battery will however then be put on the conditioning rate which effectively rids it of sulphate. This rate is, however, small enough so that the battery, even if charged to full capacity, will not be harmed, no gassing taking place, or none of a harmful character. The conditioning charge puts the battery in better condition for heavy drafts on it. Should the potential across the battery fall to a predetermined voltage, by way of example merely, to 6.3 volts, the coil 19 will be sufficiently weakened to cause the resistance between taps 14, 21 to be shorted thereby again causing the generator to operate with output characteristic A. It will be obvious that the predetermined maximum and minimum voltages across the battery necessary to cause the effective operation of relay armature 16 either from its closed to open position or vice versa may be varied in different ways such as by adjustment of spring 18, the position of the contact 17 or armature 16, the strength of coil 19 or its magnetic circuit, or otherwise. Such adjustments and matters of design are known to those skilled in the art and are therefore not shown. The selection of the maximum and minimum voltages at which it is desired that relay armature 16 shall be effectively attracted or pulled off again will depend to some extent on the desired amperage of the charging current inasmuch as the latter affects the voltage across the battery. The same is true as to resistance changes in the battery due to temperature.

If it be assumed that the generator is operating on characteristic A and the lamps are connected by closure of switch 24, the switch 25 will short-circuit the resistance between taps 21, 27. This resistance may be so selected that the generator will produce an output curve such as curve B, Fig. 7, having a maximum value $B_{max}$. This maximum value may be so chosen if desired that the difference between it and a substantially constant demand D of the lamps, ignition circuits, or other translating devices will be substantially the same as the value $A_{max}$. The battery will then be charged at substantially the same maximum rate whether the lamps are on or off. When, as previously described, the voltage across the battery rises to a predetermined value the resistance between taps 14, 21 will be inserted. This reduces the output characteristic of the generator to a curve such as B′ having a maximum value $B'_{max}$. This maximum value may be so chosen as to be somewhat in excess of the demand D so that at speeds at which good lights are required, if the system is used on an automotive vehicle, the lamps will be fed in parallel with the charging battery. If the curve B′ has the illustrative form in which, at higher speeds, it falls somewhat below the demand line D, this will not result in poorer lighting because the adjustment of relay 16 is preferably such that when no current or a predetermined small current only passes into the battery, the resistance between taps 14, 21 will be shorted thereby changing the output curve to curve B, thus again supplying the lamps in parallel with the charging battery. Inasmuch, however, as the curve B is here shown as having a drooping characteristic, the value of the output at high speeds will be within safe limits so that even with continued operation of the system the battery will not be materially overcharged. Whatever form of characteristic curves a generator may have, whether of drooping form or otherwise, I prefer, for best results, to so adjust the output that at high speeds curve B will be somewhat above the demand line D, in other words so that if and when lamps are connected to the system they will be fed in parallel with a charging battery.

It is desirable under some conditions that the output characteristic B be of less drooping form, the high speed values being made greater and the medium speed values less. In this case it is preferable that the output curve B′ shall not fall below the demand line D at high speeds. The relay 16 may then be so adjusted that when the battery is charging on the higher characteristic and reaches a predetermined fully charged state as represented by a predetermined desired voltage across its terminals, the relay will open and the generator will provide the lower output, the battery remaining on this characteristic at high as well as at medium speeds. Of course should the battery voltage at some subsequent time fall to say 6.3 volts, the relay will, if adjusted for that minimum voltage, shift the generator to the higher characteristic.

Figure 7:
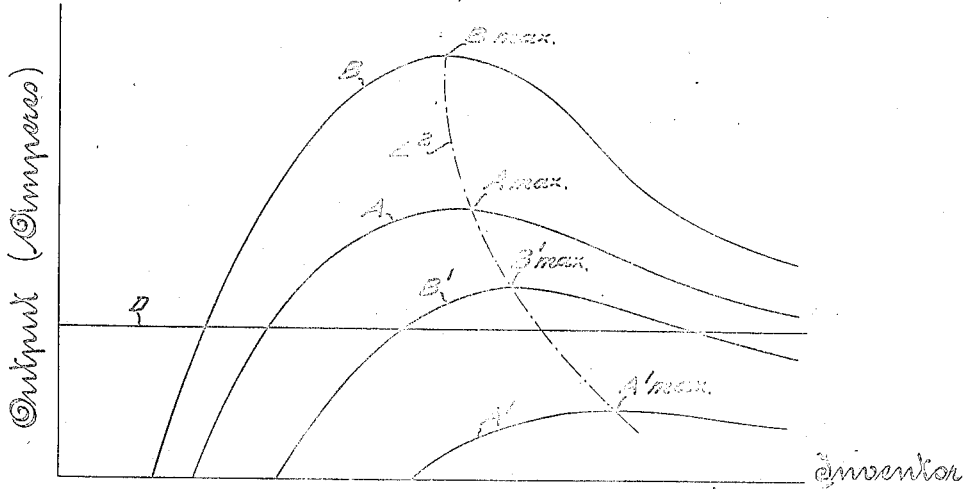
Fig. 7 shows typical characteristic curves such as may be secured by one form of my invention.

It is to be understood that I do not limit myself to any particular form and magnitude of the curves shown in Fig. 7, nor to the particular described maximum value of these curves, but these may be chosen to suit the conditions it is desired to meet.

If but three output curves are necessary to meet the conditions, the resistance between taps 14, 21 and taps 21, 27 may be made equal, or the adjustable tap 27 may be placed between the taps 21 and 14.

In general, it will be clear that if desired no adjustable taps need be employed on resistance 13 if the desired resistances are determined for a given type of generator and made, thereafter, of fixed value for that type.

Figure 6:
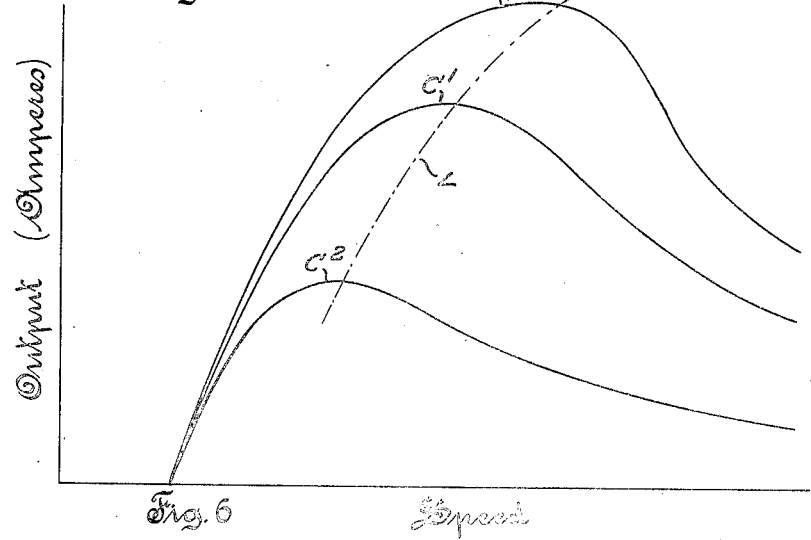
Fig. 6 shows typical characteristic curves obtainable with one type of generator, by way of illustration, with which my invention may be used.

In Fig. 6 are shown a number of output curves C, C′, C² of a certain type of third brush generator in extensive use. The curves represent different settings of the third brush and they all have their origin at substantially the same speed value. In this generator as the brush is shifted to produce a higher maximum output, the curve becomes of a more pronounced drooping characteristic. It will be noted that the locus of maxima is on a line L which in this instance makes a general angle of less than ninety degrees with the axis of abscissæ whereas the locus of maxima L² of Fig. 7 makes an angle of greater than ninety degrees. By proper adjustment of the third brush and the insertion of an initial resistance in the field winding the maximum value of the curves in Fig. 7 may therefore be caused to occur at desired speeds and upon the insertion of additional resistances such as those between taps 14, 21 and taps 21, 27. I have found that in some generators with certain third brush positions the insertion of equal increments of resistance in a field winding will not produce equal decrements of maximum output value. For example, the first increments may produce a greater reduction in maximum output than further increments.

This may be corrected by adjusting the third brush position and if necessary varying the initial resistance in the field winding, such as a resistance between taps 27, 29. This changes the locus L² of Fig. 7 and it may be possible in a given generator to thereby cause equal increments of resistance in the field winding to produce more equal decrements of maximum output. Generators of different manufacture may moreover produce output characteristics of different form and these will naturally require different adjustment but those skilled in the art may, from the foregoing description, readily make them.

In some cases four (or some other desired number) output curves as shown in Fig. 7 may not be obtainable of just the desired maximum values. This would be true in some cases where more exacting conditions are to be met. In such cases it may become desirable to cause the relay responsive to voltage across the battery to insert either less or more resistance in the circuit of the field winding when said relay opens while the lamps are connected. I have shown in Figs. 2 and 3 respectively, means whereby this may be accomplished.

Figure 2:
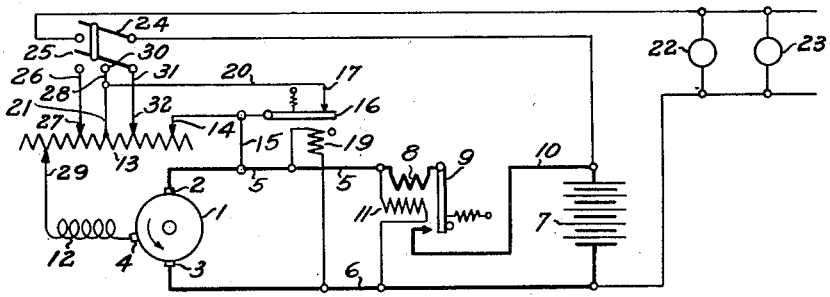
Fig. 2 is a modification.

Referring to Fig. 2, the parts corresponding to those of Fig. 1 have been given the same reference numerals and need no further description. As in Fig. 1, the switch 25 is adapted to short-circuit the portion of resistance 13 between taps 21, 27. The conductor 28 in this instance leads to an additional switch contact 30, and a conductor 31 is provided for connecting the switch blade to a tap 32 on resistance 13, here shown as adjustable. It is clear that when switch 25 is closed that portion of resistance 13 between taps 32, 21 will be also short-circuited. It is therefore evident that when lamps 22, 23 are connected, the relay 16 will, when it opens, insert less resistance in the field winding than when the lamps are not connected. This is of course also true when the adjustable tap 27 is coincident with the tap 21, in which case three output curves may be obtained, the conditions being then the same as in Fig. 1 in the case where the adjustable tap 27 is placed between the taps 21 and 14.

Figure 3:
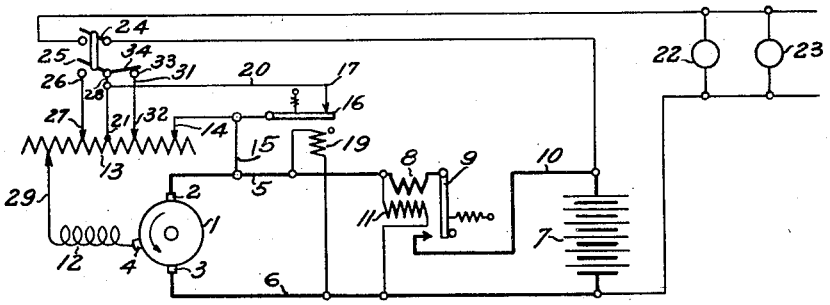
Fig. 3 is another modification.

In Fig. 3 the conductors 26, 28 may be connected, as in Fig. 2, by switch 25, but the conductor 28 is connected to the switch blade, and the conductor 31 is connected to an auxiliary contact 33. An auxiliary contact 34 movable in unison with switch 25 is adapted to bridge conductors 28, 31 when the switch is thrown to its open position thereby short-circuiting the resistance between taps 21, 32.

The operation of the systems of Figs. 2 and 3 will be readily understood. While third brush generators are here illustrated it is to be understood that other forms of generators may be employed in some aspects of the invention.

Figure 4:
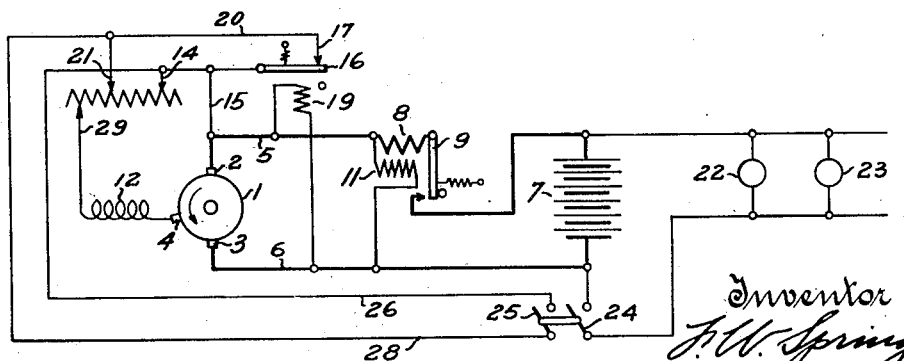
Fig. 4 is a somewhat simplified modification.

Under certain conditions where the greater refinements of and results attained by the systems hereinbefore described, are not required and where it is desired to reduce the output of the generator when the battery reaches a predetermined state of charge, only when the translating devices are not connected to the battery, the system shown in Fig. 4 may be employed. This differs from Fig. 1 in that the tap 27 of that figure is not employed but the conductor 26 is connected to tap 14. When, therefore, the switches 24 and 25 are closed, the switch 25 shorts the resistance between taps 21, 14 which is the same resistance as controlled by relay armature 16. Consequently under these conditions the opening of relay 16 has no effect on the output. The relay of course adequately protects the battery when the translating devices are not connected. If a third brush generator is utilized the outputs at medium speeds, with the translating devices connected, will be sufficient to charge the battery, and at the usual higher speeds the battery will be still less likely to be overcharged because of the falling characteristic of the generator, though such a generator is not absolutely essential. It will be apparent that Fig. 4 is another special case of Fig. 1 since Fig. 1 may be readily converted into the form of Fig. 4 by placing the adjustable tap 27 coincident with the tap 14.

Figure 5:
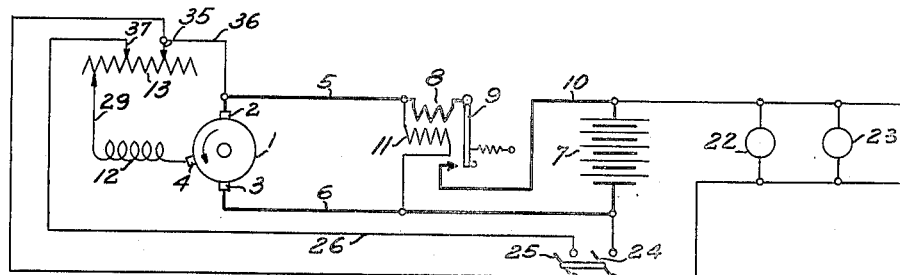
Fig. 5 is a further simplified modification.

Under certain conditions it may be sufficient to merely increase the output of the generator when translating devices are connected and the voltage responsive relay may be dispensed with. Such a system is illustrated in Fig. 5. Here the conductor 28 leading from switch 25 is connected to resistance 13 through a tap 35 here shown as adjustable. The tap 35 is also connected through conductor 36 to conductor 5. The other conductors 26, leading from switch 25, is connected to resistance 13 through a tap 37 here shown as adjustable. It will be evident that when the translating devices 22, 23 are connected, the switch 25 will short-circuit the resistance between taps 35, 37 thereby increasing the output of the generator to a desired value.

In general, if a two brush generator is employed, that is, a generator not of the third brush type the field winding 12 in the various figures of the drawings may have its lower terminal connected to brush 3. As such variations are obvious they have not been shown in the drawings. The invention is of course applicable to single or double unit systems. The cut-out 8, 9, 11 is not essential to the invention and any other means, direct or indirect, may be utilized for connecting the generator to the battery or system. By the term generator I wish to have understood any dynamo electric machine which either at all times or only at predetermined times acts as a generator.

It will be clear to those skilled in the art that my invention provides a means whereby, when the same is used on automotive vehicles for example, all conditions of operation of the system with the vehicle are adequately and automatically taken care of while the vehicle is in service, that is, is not standing idle for an unreasonable length of time so that the battery might lose its charge. With the present invention it is not necessary to adjust the output of the generator for summer and winter driving, nor for continuous night or day driving, nor for heavy or light starting-motor-demands, nor combinations of these conditions or in fact for the widely varying conditions and demands to which automotive electrical equipment of this nature is subjected. At the same time the battery will be kept fully charged under all conditions of service, its life will be increased and over-gassing minimized; over-heating of the generator and other parts of the system prevented; and a better supply of current to translating devices connected to the battery provided.

It should be understood that it is not desired to limit the invention to the exact details of construction and operation shown and described, for obvious modifications may occur to persons skilled in the art.

It is claimed and desired to secure by Letters Patent:

1. The combination with a third brush generator, of a translating device, means for connecting said translating device to said generator, and means for increasing the total output of said generator in response to the connection of said translating device.

2. The combination with a third brush generator, of a battery, means for connecting said generator to said battery, at least one lamp, means for controlling the output of said generator in accordance with the condition of said battery, means for connecting said lamp to said battery, and means for increasing the total output of said generator in response to the connection of said lamp and irrespective of the condition of said battery.

3. The combination with a third brush generator having a shunt field winding, of a translating device, means for connecting said translating device to said generator, a resistance in series with said field winding, and means responsive to the connection of said translating device for removing said resistance.

4. The combination with a third brush generator having a shunt field winding, of a battery, means for connecting said generator to said battery, at least one lamp, means for controlling the output of said generator in accordance with the condition of said battery, means for connecting said lamp to said battery, a resistance in series with said field winding, and means responsive to the connection of said lamp for removing said resistance and irrespective of the condition of said battery.

5. The combination with a generator, of a battery, means for connecting said generator to said battery, at least one lamp, means for connecting said lamp to said battery, means responsive to the connection of said lamp for increasing the total output of said generator, and means responsive to a characteristic of the energy supplied by said generator to said battery for reducing the total output of said generator.

6. The combination with a generator, of a battery, means for connecting said generator to said battery, at least one lamp, means for connecting said lamp to said battery, means responsive to the connection of said lamp for increasing the total output of said generator irrespective of the state of charge of said battery, and means responsive to a characteristic of the energy supplied by said generator to said battery for reducing the total output of said generator.

7. The combination with a generator, of a battery, means for connecting said generator to said battery at a predetermined speed of said generator, at least one lamp, means for connecting said lamp to said battery, means responsive to the connection of said lamp for causing said generator to be connected to said battery at a lower predetermined generator speed, and means responsive to a characteristic of the energy supplied by said generator to said battery for reducing the output of said generator.

8. The combination with a third brush generator having a shunt field winding, of a battery, means for connecting said generator to said battery, at least one lamp, means for connecting said lamp to said battery, a resistance in series with said field winding, means responsive to the connection of said lamp for controlling the value of said resistance, and means responsive to a characteristic of the energy supplied by said generator to said battery for also controlling the value of said resistance.

9. The combination with a third brush generator having a shunt field winding, of a battery, means for connecting said generator to said battery, at least one lamp, means for connecting said lamp to said battery, a resistance in series with said field winding, means responsive to the connection of said lamp for removing a portion of said resistance, and means responsive to a characteristic of the energy supplied by said generator to said battery for removing or inserting another portion of said resistance distinct from said first portion dependent upon predetermined minimum and maximum values of said characteristic respectively.

10. The combination with a third brush generator having a shunt field winding, of a battery, means for connecting said generator to said battery, at least one lamp, means for connecting said lamp to said battery, a resistance in series with said field winding, means responsive to the connection of said lamp for removing a portion of said resistance, and means responsive to the voltage across said battery for removing or inserting another portion of said resistance distinct from said first portion dependent upon predetermined minimum and maximum values of said voltage respectively.

11. The combination with a generator, of a battery, means for connecting said generator to said battery, at least one lamp, means for connecting said lamp to said battery, means whereby when said lamp is disconnected the output of said generator will have a predetermined maximum, means responsive to a characteristic of the energy supplied by said generator to said battery for reducing said output to a lower predetermined maximum, and means whereby when said lamp is connected both of said predetermined maximum values are increased.

12. The combination with a third brush generator, of a battery, means for connecting said generator to said battery, at least one lamp, means for connecting said lamp to said battery, means whereby when said lamp is disconnected the output of said generator will have a predetermined maximum, means responsive to a characteristic of the energy supplied by said generator to said battery for reducing said output to a lower predetermined maximum, and means whereby when said lamp is connected both of said predetermined maximum values are increased.

13. The combination with a generator, of a battery, means for connecting said generator to said battery, at least one lamp, means for connecting said lamp to said battery, means whereby when said lamp is disconnected the output of said generator will have a predetermined maximum, means responsive to a characteristic of the energy supplied by said generator to said battery for reducing said output to a lower predetermined maximum, and means whereby when said lamp is connected both of said predetermined maximum values are increased, said lower predetermined maximum being increased to an amount in excess of the demand on the battery.

14. The combination with a generator, a battery, means for connecting said generator to said battery at a predetermined generator-speed, at least one lamp, and means for connecting said lamp to said battery, said generator having a predetermined maximum output when said lamp is not connected, of means responsive to the connection of said lamp for increasing the maximum output of said generator, means for varying the said maximum outputs of said generator while permitting said generator to be connected to said battery at approximately the same speed, and means for varying said maximum outputs while simultaneously varying the speed at which said generator will be connected to said battery.

15. The combination with a generator, of a battery, means for connecting said generator to said battery, at least one lamp, means for connecting said lamp to said battery, means responsive to the connection of said lamp for increasing the total output of said generator, means responsive to a characteristic of the energy supplied by said generator to said battery for modifying the output, and means responsive to the connection of said lamp for controlling said modifying means.

16. The combination with a generator, of a battery, means for connecting said generator to said battery, at least one lamp, means for connecting said lamp to said battery, means responsive to the connection of said lamp for increasing the total output of said generator, means responsive to a characteristic of the energy supplied by said generator to said battery for modifying the output, and means responsive to the connection of said lamp for controlling the character of the modification produced by said modifying means.

17. The combination with a generator having a field winding, of a battery, means for connecting said generator to said battery, at least one lamp, means for connecting said lamp to said battery, a resistance in series with said field winding, means whereby the connection of said lamp causes the removal of a portion of said resistance from the circuit of said field winding, means responsive to a characteristic of the energy supplied by said generator to said battery for inserting another portion of said resistance distinct from said first portion in the circuit of said field winding, and means responsive to the connection of said lamp for changing the value of said last named portion of said resistance.

18. The combination with a third brush generator having a shunt field winding, of a battery, means for connecting said generator to said battery, at least one lamp, means for connecting said lamp to said battery, a resistance in series with said field winding, means whereby the connection of said lamp causes the removal of a portion of said resistance from the circuit of said field winding, means responsive to a characteristic of the energy supplied by said generator to said battery for removing or inserting another portion of said resistance distinct from said first portion in the circuit of said field winding dependent upon predetermined minimum and maximum values of said characteristic respectively, and means whereby when said lamp is connected said last named means inserts a resistance of less value in response to a predetermined maximum of said energy characteristic.

19. The combination with a third brush generator, operating with a falling current-speed characteristic and having a shunt field winding only, of a battery, means for connecting said generator to said battery, at least one lamp, means for connecting said lamp to said battery, a resistance in series with said field winding, means responsive to the connection of said lamp for controlling the value of said resistance, and means responsive to the voltage across said battery for also controlling the value of said resistance.

20. The combination with a generator, having a field winding, providing predetermined high outputs at certain speeds and predetermined lower outputs at higher speed, of a battery, means for connecting said generator to said battery, at least one lamp, means for connecting said lamp to said battery, a resistance in series with said field winding, means responsive to the connection of said lamp for controlling the value of said resistance, and means responsive to the voltage across said battery for also controlling the value of said resistance.

21. The combination with a generator, of a battery, means for connecting said generator to said battery, at least one lamp, means for connecting said lamp to said battery, means whereby when said lamp is disconnected the output of said generator will have a predetermined maximum, means responsive to a characteristic of the energy supplied by said generator to said battery for reducing said output to a lower predetermined maximum, and means whereby when said lamp is connected at least one of said predetermined maximum values is increased.

22. The combination with a third brush generator, of a battery, means for connecting said generator to said battery, at least one lamp, means for connecting said lamp to said battery, means whereby when said lamp is disconnected the output of said generator will have a predetermined maximum, means responsive to a characteristic of the energy supplied by said generator to said battery for reducing said output to a lower predetermined maximum, and means whereby when said lamp is connected at least one of said predetermined maximum values is increased.

23. The combination with a generator, of a battery, means for connecting said generator to said battery, at least one lamp, means for connecting said lamp to said battery, means whereby when said lamp is disconnected the output of said generator will have a predetermined maximum, means responsive to a characteristic of the energy supplied by said generator to said battery for reducing said output to a lower predetermined maximum, and means whereby when said lamp is connected, said lower predetermined maximum is increased to an amount in excess of the demand on the battery.

24. The combination with a generator, of a battery, means for connecting said generator to said battery, at least one lamp, means for connecting said lamp to said battery, means responsive to a characteristic of the energy supplied by said generator to said battery for modifying the output of said generator, and means responsive to the connection of said lamp for controlling said modifying means.

25. The combination with a generator having a field winding, of a battery, means for connecting said generator to said battery, at least one lamp, means for connecting said lamp to said battery, a resistance in series with said field winding, a relay having an operating winding in shunt with said generator and battery when connected, said relay short-circuiting a portion of said resistance when said winding is effectively deenergized, and means whereby the connection of said lamp may be caused to increase the output of said generator while said relay is effectively energized only.

26. The combination with a third brush generator having a field winding, of a battery, means for connecting said generator to said battery, at least one lamp, means for connecting said lamp to said battery, a resistance in series with said field winding, a relay having an operating winding in shunt with said generator and battery whenever said generator and battery are connected, said relay short-circuiting a portion of said resistance when said winding is effectively deenergized, and means whereby the connection of said lamp may be caused to increase the output of said generator while said relay is effectively energized only.

27. The combination with a generator, operable with a falling current-speed characteristic and having a shunt field winding only, of a battery, means for connecting said generator to said battery, at least one lamp, means for connecting said lamp to said battery, a resistance in series with said field winding, a relay having an operating winding in shunt with said generator and battery when connected, said relay short-circuiting a portion of said resistance when said winding is effectively deenergized, and means whereby the connection of said lamp may be caused to increase the output of said generator while said relay is effectively energized only.

28. The combination with a generator having a shunt field winding, of a battery, means for connecting said generator to said battery, at least one lamp, means for connecting said lamp to said battery, a resistance in series with said field winding, a relay having an operating winding in shunt with said generator and battery when connected, said relay short-circuiting a portion of said resistance when said winding is effectively deenergized, and means whereby the connection of said lamp may be caused to short-circuit a portion of the aforesaid portion of resistance only.

29. The combination with a third brush generator having a shunt field winding, of a battery, means for connecting said generator to said battery, at least one lamp, means for connecting said lamp to said battery, a resistance in series with said field winding, a relay having an operating winding in shunt with said generator and battery when connected, said relay short-circuiting a portion of said resistance when said winding is effectively deenergized, and means whereby the connection of said lamp may be caused to short-circuit a portion of the aforesaid portion of resistance only.

30. The combination with a generator, having a field winding, providing predetermined high outputs at certain speeds and predetermined lower outputs at higher speeds, of a battery, means for connecting said generator to said battery, at least one lamp, means for connecting said lamp to said battery, a resistance in series with said field winding, a relay having an operating winding in shunt with said generator and battery when connected, said relay short-circuiting a portion of said resistance when said winding is effectively deenergized, and means whereby the connection of said lamp may be caused to short-circuit a portion of the aforesaid portion of resistance only.

31. The combination with a generator, operable with a falling current-speed characteristic and having a shunt field winding only, of a battery, means for connecting said generator to said battery, at least one lamp, means for connecting said lamp to said battery, a resistance in series with said field winding, a relay having an operating winding in shunt with said generator and battery when connected, said relay short-circuiting a portion of said resistance when said winding is effectively deenergized, and means whereby the connection of said lamp may be caused to short-circuit a portion of the aforesaid portion of resistance only.

32. The combination with a third brush generator, of a battery, a translating device connectible to said battery, means whereby said generator may be caused to deliver three different output characteristics, including means for adjusting the maximum value of the maximum output characteristic and the shape thereof, means for reducing the output of said generator in response to a predetermined maximum voltage across said battery, and means responsive to a predetermined maximum voltage across said battery for reducing the maximum output of said generator when said device is connected to an amount sufficient to give a predetermined comparatively small net charge current to said battery.

33. The combination with a generator, operable with a falling current-speed characteristic, of a battery, means whereby said generator may be caused to deliver three different output characteristics including means for reducing the maximum output of said generator and causing the output characteristic to assume an approximately flat-top form in response to a predetermined maximum voltage across said battery, a translating device connectible to said battery, and means for reducing the maximum output of said generator a less amount and causing the output characteristic to assume an approximately flat-top form in response to a predetermined voltage across said battery when said device is connected, the generator continuing to operate on its maximum output characteristic when said device is connected if the voltage across the battery is below a predetermined maximum.

34. The combination with a generator, of a battery, a translating device connectible to said battery, means for reducing the maximum output of said generator in response to a predetermined maximum voltage across said battery, and means responsive to a predetermined maximum voltage across said battery for reducing the maximum output of said generator when said device is connected to an amount sufficient to give a predetermined comparatively small net charge current to said battery, and means for adjusting said reduced outputs independently of each other.

35. The combination with a third brush generator, of a battery, means for connecting said generator to said battery, a translating device connectible to said battery, means for reducing the maximum output of said generator in response to a predetermined maximum voltage across said battery, and means responsive to a predetermined maximum voltage across said battery for reducing the maximum output of said generator when said device is connected to an amount sufficient to give a predetermined comparatively small net charge current to said battery, and means for adjusting said reduced outputs independently of each other.

36. The combination with a third brush generator, of a battery, means for connecting said generator to said battery, a translating device connectible to said battery, means for adjusting the maximum value of the maximum output characteristic and the shape thereof, means for reducing the maximum output of said generator in response to a predetermined maximum voltage across said battery, and means responsive to a predetermined maximum voltage across said battery for reducing the maximum output of said generator when said device is connected to an amount sufficient to give a predetermined comparatively small net charge current to said battery, and means for adjusting said reduced outputs independently of each other.

37. The combination with a generator, of a battery, means for connecting said generator to said battery, means whereby said generator may be caused to deliver three different output characteristics including means responsive to a predetermined maximum voltage across said battery for reducing the maximum output of said generator to a predetermined comparatively small value, a translating device connectible to said battery, and means responsive to a predetermined maximum voltage across said battery for reducing the maximum output of said generator when said translating device is connected to an amount sufficient to give a predetermined comparatively small net charge current to said battery, and means for adjusting said reduced outputs independently of each other.

38. The combination with a generator, operable with a falling current-speed characteristic, of a battery, means for connecting said generator to said battery, means whereby said generator may be caused to deliver three different output characteristics including means responsive to a predetermined maximum voltage across said battery for reducing the maxmium output of said generator to a predetermined comparatively small value, a translating device connectible to said battery, and means responsive to a predetermined maximum voltage across said battery for reducing the maximum output of said generator when said translating device is connected to an amount sufficient to give a predetermined comparatively small net charge current to said battery, and means for adjusting said reduced outputs independently of each other.

In testimony whereof, the signature of the inventor is affixed hereto.

FRANKLIN W. SPRINGER.